United States Patent
Okabe et al.

(10) Patent No.: US 8,196,021 B2
(45) Date of Patent: Jun. 5, 2012

(54) APPARATUS AND METHOD FOR FRAME TRANSMISSION

(75) Inventors: Katsuyuki Okabe, Fukuoka (JP); Toshitsugu Hagio, Fukuoka (JP); Kenichi Ohyama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 12/320,596

(22) Filed: Jan. 29, 2009

(65) Prior Publication Data

US 2009/0287985 A1  Nov. 19, 2009

(30) Foreign Application Priority Data

May 19, 2008  (JP) .................................. 2008-131237

(51) Int. Cl.
*H03M 13/00* (2006.01)
(52) U.S. Cl. ........................................ 714/776; 714/758
(58) Field of Classification Search .................. 714/776, 714/758
See application file for complete search history.

(56) References Cited

U.S. PATENT DOCUMENTS

| | | | | |
|---|---|---|---|---|
| 4,734,901 A * | 3/1988 | Murakami | ................. | 369/59.25 |
| 4,873,684 A * | 10/1989 | Kobayashi et al. | ............ | 370/506 |
| 5,388,105 A * | 2/1995 | Takagi et al. | ................. | 714/758 |
| 5,604,646 A * | 2/1997 | Yamawaki | ....................... | 360/53 |
| 5,650,947 A * | 7/1997 | Okumura | ........................ | 703/16 |
| 5,796,690 A * | 8/1998 | Kanno | ........................ | 369/47.18 |
| 6,275,480 B1 * | 8/2001 | Schreier | ......................... | 370/321 |
| 7,280,739 B2 * | 10/2007 | Yamauchi et al. | ............ | 386/231 |
| 7,697,818 B2 * | 4/2010 | Noritake | ....................... | 386/350 |
| 7,738,461 B2 * | 6/2010 | Nakamura | ..................... | 370/392 |
| RE42,791 E * | 10/2011 | Cho | .............................. | 375/372 |
| RE42,792 E * | 10/2011 | Cho | .............................. | 375/372 |
| 2001/0008001 A1 * | 7/2001 | Suemura | ....................... | 710/129 |
| 2006/0153240 A1 | 7/2006 | Kikuma | | |

FOREIGN PATENT DOCUMENTS

JP  2006-197045  7/2006

* cited by examiner

*Primary Examiner* — Joseph D Torres
(74) *Attorney, Agent, or Firm* — Staas & Halsey LLP (57) ABSTRACT

An apparatus for frame transmission includes a dummy data inserting unit that inserts dummy data, at timing of an interval in which a received frame input intermittently is not detected, in a sequence of processing processes of scrambling processing of user data cut out from the received frame, reading-out of the data after the scrambling processing with a parity appended thereto from a memory and parity checking thereof, and descrambling processing of the data after the parity checking, and an error determining unit that determines whether an error is occurring in the sequence of the processing processes, based on the dummy data obtained by the descrambling processing of the dummy data inserted in the sequence of the processing processes by the dummy data inserting unit.

8 Claims, 6 Drawing Sheets

APPARATUS AND METHOD FOR FRAME TRANSMISSION

CROSS-REFERENCE TO RELATED APPLICATION(S)

This application is based upon and claims the benefit of priority of the prior Japanese Patent Application No. 2008-131237, filed on May 19, 2008, the entire contents of which are incorporated herein by reference.

FIELD

The embodiment(s) discussed herein is (are) directed to an apparatus and a method for frame transmission.

BACKGROUND

Conventionally, there is a frame transmitting apparatus that transmits a packet frame (see, e.g., Japanese Laid-open Patent Publication No. 2006-197045).

A brief description is provided below with reference to FIG. 6 regarding processing performed by the conventional frame transmitting apparatus for transmitting a packet frame.

Figure 6:
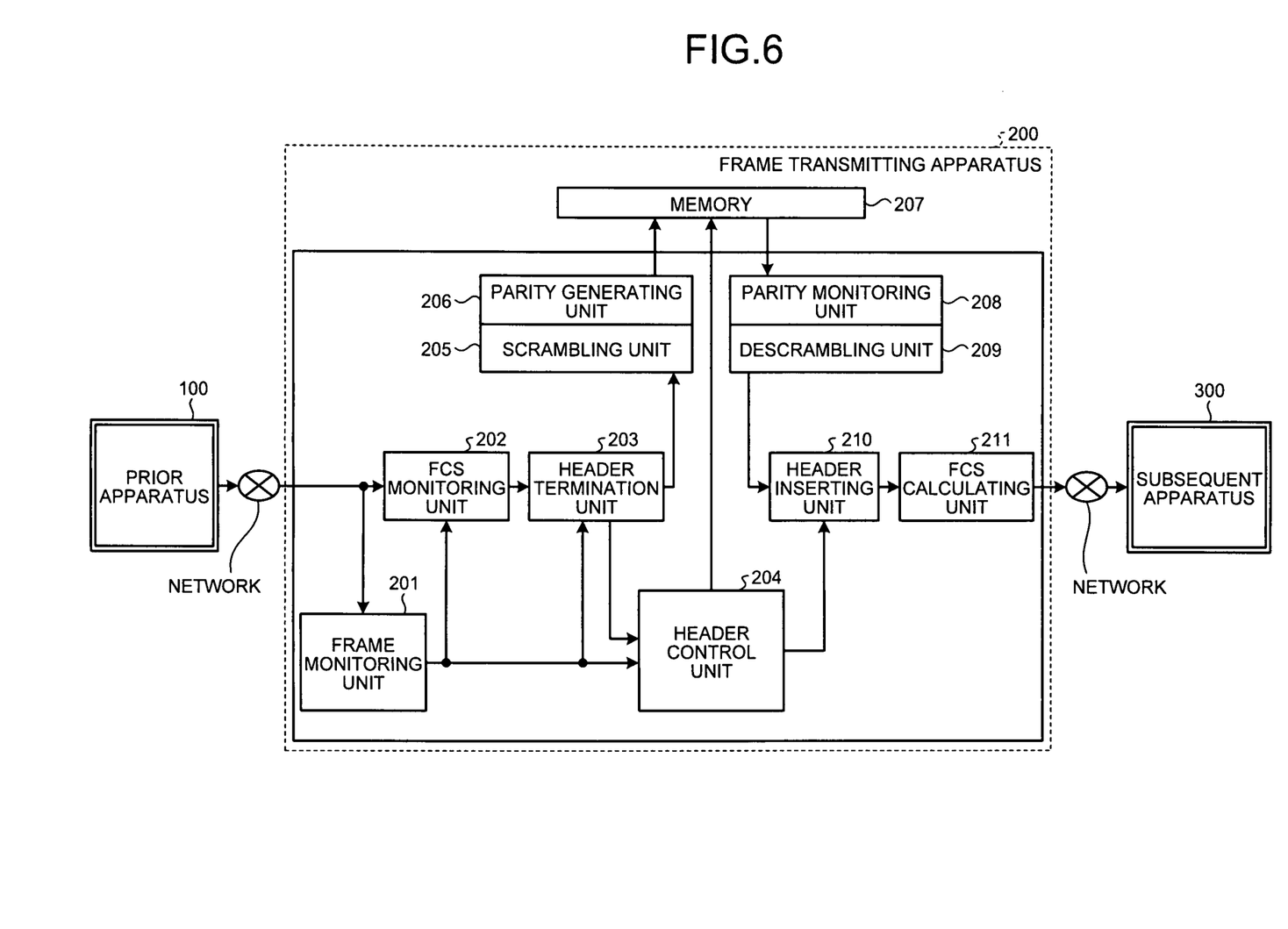
FIG. 6 is a diagram of a conventional configuration of the frame transmitting apparatus.

As depicted in FIG. 6, a frame transmitting apparatus 200 is connected in a communication-capable state with a prior apparatus 100 and a subsequent apparatus 300 of a same configuration via a network.

A frame monitoring unit 201, upon detection of input of a received frame transmitted by the prior apparatus 100, generates a timing signal to indicate timing of processing of the received frame and outputs the timing signal to subsequent processing function units.

Next, an FCS monitoring unit 202, after checking the received frame, using FCS (Frame Check Sequence) data for error detection appended to the received frame, deletes the FCS data from the received frame and outputs the received frame to a header termination unit 203.

The header termination unit 203 outputs a header within the received frame that stores an address, a tag, length, etc., to a header control unit 204 and cuts out user data within the received frame and outputs it to a scrambling unit 205.

The scrambling unit 205 performs scrambling processing on the user data and outputs the scrambled user data to a parity generating unit 206. The parity generating unit 206 appends a parity to the scrambled user data and outputs the resulting data to a memory 207.

The memory 207, under control of the header control unit 204 to be described later, writes the data received from the parity generating unit 206 and reads out the data and outputs the read-out data to a parity monitoring unit 208 to be described later.

The header control unit 204 manages the address of the data to be stored in the memory 207 and causes the memory 207 to output the stored data to the parity monitoring unit 208. The header control unit 204 also rewrites the header received from the header termination unit 203 and outputs the resulting data to a header inserting unit 210.

The parity monitoring unit 208 performs a parity check of the data received from the memory 207 and outputs the resulting data to a descrambling unit 209. The descrambling unit 209 performs descrambling processing on the data received from the parity monitoring unit 208 and outputs the resulting data to the header inserting unit 210.

The header inserting unit 210 appends the header received from the header control unit 204 to the data received from the descrambling unit 209 and outputs the data to an FCS calculating unit 211.

The FCS calculating unit 211 performs FCS calculation and appends FCS data to the data received from the header inserting unit 210 and transmits the data to the subsequent apparatus 300 via the network.

However, the above conventional frame transmitting processing has had a problem that there is a case of not detecting an error occurring in the process of the transmitting processing of the received frame.

Namely, the conventional processing has had a problem that when, at the time of writing the user data to the memory 207, the parity appended to the user data makes 2 bit errors, occurrence of the error to the user data may not be detected.

The conventional processing has had a problem that, likewise, the error caused to the user data by malfunction of the scrambling unit 205 may not be detected.

While it is possible to process by writing to the memory 207 the data with the error-detection FCS left appended thereto, such processing causes a large amount of data to be written, and therefore, has a problem that a memory size must be enlarged.

SUMMARY

According to one aspect of the invention, an apparatus for frame transmission includes a dummy data inserting unit that inserts dummy data, at timing of an interval in which a received frame input intermittently is not detected, in a sequence of processing processes of scrambling processing of user data cut out from the received frame, reading-out of the data after the scrambling processing with a parity appended thereto from a memory and parity checking thereof, and descrambling processing of the data after the parity checking, and an error determining unit that determines whether an error is occurring in the sequence of the processing processes, based on the dummy data obtained by the descrambling processing of the dummy data inserted in the sequence of the processing processes by the dummy data inserting unit.

According to another aspect of an embodiment, a method for frame transmission includes inserting dummy data, at timing of an interval in which a received frame input intermittently is not detected, in a sequence of processing processes of scrambling processing of user data cut out from the received frame, reading-out of the data after the scrambling processing with a parity appended thereto from a memory and parity checking thereof, and descrambling processing of the data after the parity checking, and determining whether an error is occurring in the sequence of the processing processes, based on the dummy data obtained by the descrambling processing of the dummy data inserted in the sequence of the processing processes in the inserting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

An embodiment will now be described in detail of a frame transmitting apparatus and a frame transmitting method with reference to the accompanying drawings.

[a] First Embodiment

Figure 1:
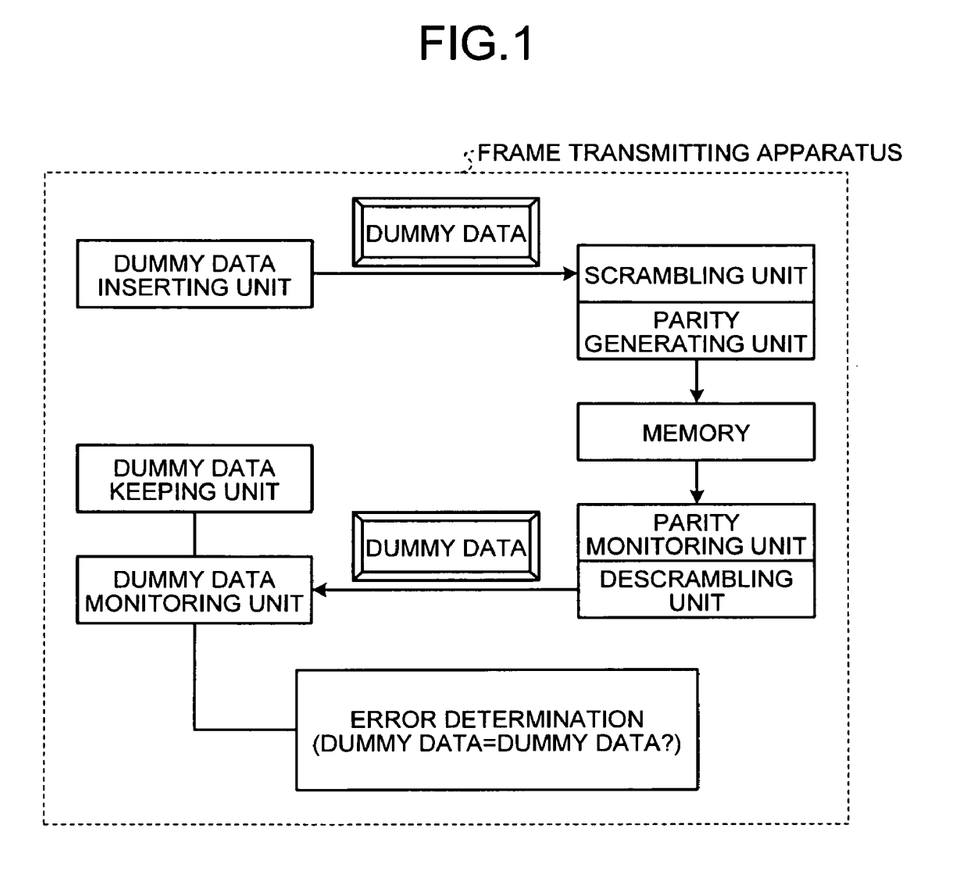
FIG. 1 is a diagram for explaining an outline of a frame transmitting apparatus according to a first embodiment.

FIG. 1 is a diagram for explaining an outline of the frame transmitting apparatus according to a first embodiment.

As depicted in FIG. 1, the frame transmitting apparatus according to the first embodiment includes a dummy data inserting unit, a scrambling unit, a parity generating unit, a memory, a parity monitoring unit, a descrambling unit, a dummy data keeping unit, and a dummy data monitoring unit.

An outline of the frame transmitting apparatus according to the first embodiment is to transmit a received frame while applying processing for keeping integrity of the received frame, by processing in a sequence of processing processes of processing of user data cut out from the intermittently input received frame by the scrambling unit and the parity generating unit in such order, storing of the data in the memory, and then, processing of the data read out from the memory by the parity monitoring unit and the descrambling unit in such order.

With the outline as described above, the dummy data inserting unit outputs dummy data identical to the dummy data kept in advance by the dummy data keeping unit to the scrambling unit, at timing of an interval in which the intermittently input received frame is not detected.

The scrambling unit executes scrambling processing to the dummy data received from the dummy data inserting unit and outputs the data to the parity generating unit. The parity generating unit appends a parity to the data received from the scrambling unit and outputs the data to the memory.

The parity monitoring unit executes a parity check of the data read out from the memory and outputs the data to the descrambling unit. The descrambling unit outputs the dummy data obtained by performing descrambling processing on the data received from the parity monitoring unit to the dummy data monitoring unit.

The dummy data monitoring unit, by comparing the dummy data received from the descrambling unit and the dummy data kept in advance by the dummy data keeping unit, determines whether an error is occurring in the above sequence of processing processes.

Specifically, the dummy data monitoring unit determines that the error is occurring when, as a result of comparison of the dummy data received from the descrambling unit and the dummy data kept in advance by the dummy data keeping unit, these two dummy data do not match.

When the dummy data monitoring unit determines that the error is occurring, the frame transmitting apparatus according to the first embodiment gives an alert notice of occurrence of the error to a managing device.

From the above, the frame transmitting apparatus according to the first embodiment is capable of easily detecting the error occurring in the process of the transmitting processing of the received frame.

Figure 2:
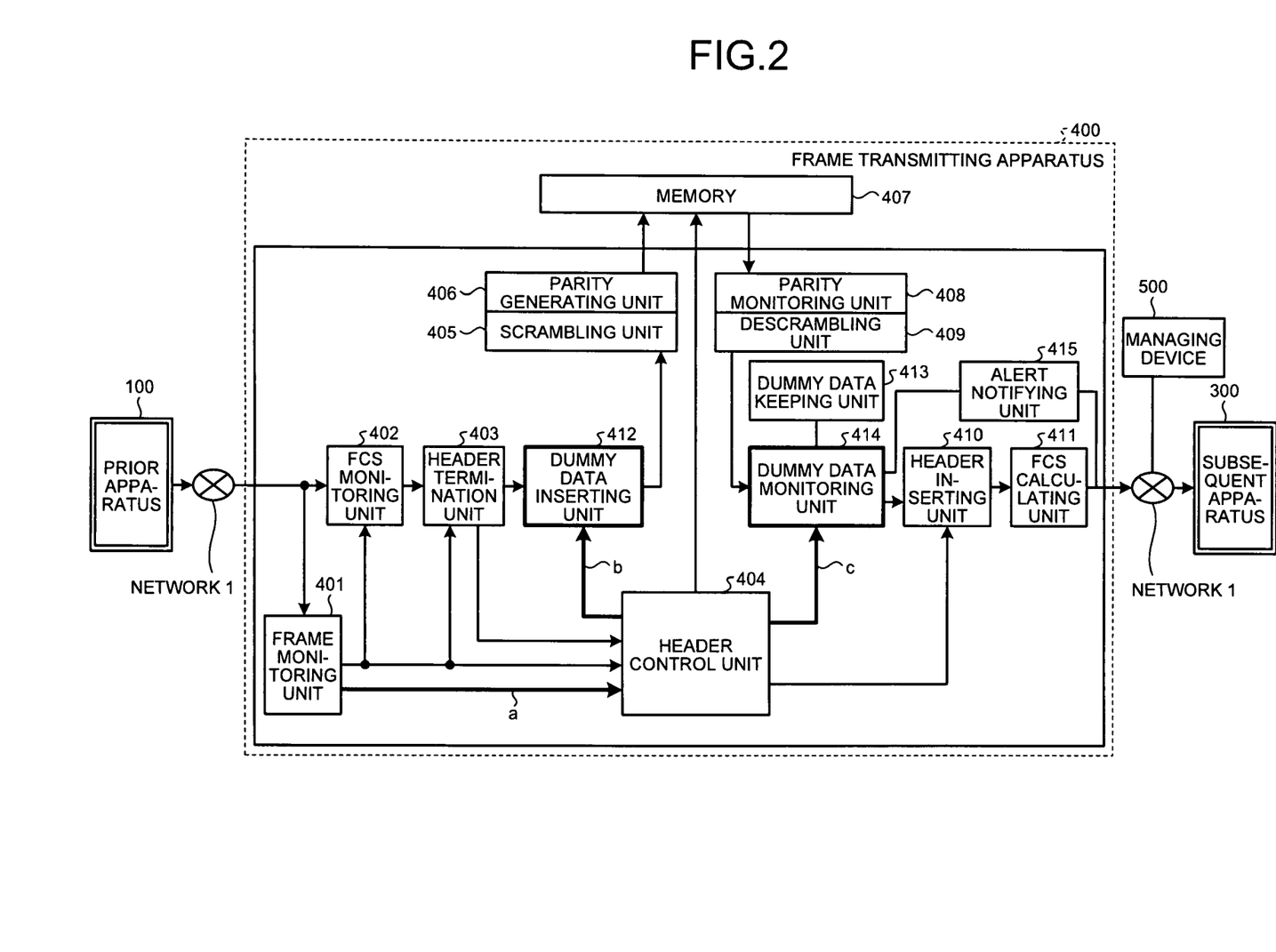
FIG. 2 is a diagram of a configuration of the frame transmitting apparatus according to the first embodiment.

FIG. 2 is a diagram of a configuration of the frame transmitting apparatus according to the first embodiment.

As depicted in FIG. 2, via a network 1, a frame transmitting apparatus 400 according to the first embodiment is connected in a communication-capable state to a prior apparatus 100 and a subsequent apparatus 300 of a same configuration and is also connected in the communication-capable state to a managing device 500 that manages the prior apparatus 100, the subsequent apparatus 300, and the frame transmitting apparatus 400.

As depicted in FIG. 2, the frame transmitting apparatus 400 includes a frame monitoring unit 401, an FCS (Frame Check Sequence) monitoring unit 402, a header termination unit 403, a header control unit 404, a scrambling unit 405, a parity generating unit 406, a memory 407, a parity monitoring unit 408, a descrambling unit 409, a header inserting unit 410, an FCS calculating unit 411, a dummy data inserting unit 412, a dummy data keeping unit 413, a dummy data monitoring unit 414, and an alert notifying unit 415.

The frame monitoring unit 401 is a processing unit that detects input of a received frame transmitted from the prior apparatus 100 and upon detection of the input of the received frame transmitted from the prior apparatus 100, generates a timing signal to notify timing of processing of the received frame and outputs it to subsequent processing function units (the FCS monitoring unit 402, the header termination unit 403, and the header control unit 404).

The frame monitoring unit 401, in the case of detection of an interval in which the received frame intermittently input is not detected, generates a timing signal (e.g., "a") indicating timing of the interval in which the received frame is not detected and outputs the timing signal to the header control unit 404.

The FCS monitoring unit 402 is a processing unit that performs checking of the received frame, using FCS (Frame Check Sequence) data for error detection appended to the received frame and after the checking of the received frame, deletes the FCS data from the received frame and outputs the received frame to the header termination unit 403.

The header termination unit 403 is a processing unit that processes the data received from the FCS monitoring unit 402, outputs a header within the received frame that stores an address, a tag, length, etc., to the header control unit 404, and cuts out user data within the received frame and outputs the user data to the scrambling unit 405.

The scrambling unit 405 is a processing unit that performs scrambling processing on the user data received from the header termination unit 403.

Specifically, the scrambling unit 405 performs the scrambling processing on the user data received from the header termination unit 403 or the dummy data received from the dummy data inserting unit 412 to be described later and outputs the processed data to the parity generating unit 406.

Incidentally, the scrambling processing is coding processing for eliminating the effect that noise generated by simultaneous switching will have on the user data and even if all bits simultaneously change to "1" or "0" for an entire width of the data to be stored in the memory, intervention of the scrambling processing in between enables distributing (averaging) the data into the data with "1" and "0" intermingled and reducing the simultaneous switching.

The parity generating unit 406 is a processing unit that appends the parity to the data or the dummy data received from the scrambling unit 405 and outputs the data or the dummy data with the parity appended thereto to the memory 407.

The header control unit 404 has a memory control function of managing the address of the data stored in the memory 407 and controlling writing to the memory 407 and reading out from the memory 407 and is a processing unit that rewrites the header received from the header termination unit 403.

Specifically, the header control unit 404, by notifying the memory 407 of a writing address, causes the memory 407 to store the data output from the parity generating unit 406 and by notifying the memory 407 of a reading-out address, causes the memory 407 to output the read-out data to the parity monitoring unit 408.

The header control unit 404 also rewrites the header received from the header termination unit 403 by changing the address, etc., to those of the subsequent apparatus 300 and outputs the rewritten header to the header inserting unit 410.

Furthermore, the header control unit 404, upon reception from the frame monitoring unit 401 of the timing signal (e.g., "a") indicating the timing of the interval in which the received frame intermittently input is not detected, calculates time of the interval in which the received frame is not detected.

Then, upon detection of the time of the interval in which the dummy data may be inserted in the above sequence of the processing processes (the sequence of the processing processes in which the data is processed by the scrambling unit 405, the parity generating unit 406, the memory 407, the parity monitoring unit 408, and the descrambling unit 409 in such order), the header control unit 404 outputs a dummy data inserting request (e.g., "b") to the dummy data inserting unit 412.

Upon outputting of the dummy data inserting request, the header control unit 404, by means of the above memory control function, notifies the memory 407 of the writing address of the dummy data to be output from the parity generating unit 406 to the memory 407, causing the memory 407 to write the dummy data and notifies the memory 407 of the reading-out address of the dummy data, causing the memory 407 to read out the dummy data and output it to the parity monitoring unit 408.

In the case of notifying the memory 407 of the reading-out address of the dummy data, the header control unit 404 outputs a dummy data reading-out notifying signal (e.g., "c") to the dummy data monitoring unit 414.

The memory 407, under control of the above header control unit 404, writes the data or the dummy data received from the parity generating unit 406 and reads out the written data or dummy data and outputs it to the parity monitoring unit 408.

The parity monitoring unit 408 is a processing unit that performs the parity check of the data or the dummy data received from the memory 407 and performs the parity check of the data or the dummy data received from the memory 407 and outputs it to the descrambling unit 409.

The descrambling unit 409 is a processing unit that performs the descrambling processing on the data or the dummy data received from the parity monitoring unit 408 and performs the descrambling processing on the data or the dummy data received from the parity monitoring unit 408 and outputs it to the dummy data monitoring unit 414 to be described later.

The descrambling processing is processing of decoding the scrambled data to original data.

The header inserting unit 410 appends the header received from the header control unit 404 to the data received from the dummy data monitoring unit 414 to be described later and outputs it to the FCS calculating unit 411.

The FCS calculating unit 411 performs FCS calculation and appends FCS data to the data received from the header inserting unit 410 and transmits the data to the subsequent apparatus 300 via the network 1.

The dummy data inserting unit 412 is a processing unit that inserts the dummy data in the above sequence of the processing processes (the sequence of the processing processes in which the data is processed by the scrambling unit 405, the parity generating unit 406, the memory 407, the parity monitoring unit 408, and the descrambling unit 409 in such order), at the timing of the interval in which the received frame intermittently input is not detected.

Specifically, the dummy data inserting unit 412, upon reception of the dummy data inserting request from the header control unit 404, inserts the dummy data identical to the dummy data kept by the dummy data keeping unit 413 to be described later into the scrambling unit 405.

The dummy data keeping unit 413 is a keeping unit that keeps the dummy data identical to the dummy data to be inserted by the dummy data inserting unit 412.

The dummy data monitoring unit 414 is a determining unit that, by comparing the dummy data output from the descrambling unit 409 after the above sequence of the processing processes and the dummy data kept in advance by the dummy data keeping unit 413, determines whether the error is occurring in the above sequence of the processing processes.

Specifically, the dummy data monitoring unit 414, in the case of having received the dummy data reading-out notifying signal (e.g., "c") from the header control unit 404, determines that the data received from the descrambling unit 409 to be the dummy data and if, as a result of comparison of this dummy data and the dummy data kept in advance by the dummy data keeping unit 413, these dummy data do not match, the dummy data monitoring unit 414 determines that the error is occurring.

Then, the dummy data monitoring unit 414, in the case of determining that the error is occurring in the above sequence of the processing processes, outputs to the alert notifying unit 415 an instruction to give the alert notice to the managing device 500.

The dummy data monitoring unit 414, in the case of having not received the dummy data reading-out notifying signal (e.g., "c") from the header control unit 404, outputs the data received from the descrambling unit 409 directly to the header inserting unit 410.

The alert notifying unit 415 is a processing unit that gives the alert notice to the managing device 500 and, upon reception of the instruction to give the alert notice from the dummy data monitoring unit 414, gives the alert notice that the error is occurring to the managing device 500.

Each function of the frame monitoring unit 401, the header control unit 404, the dummy data inserting unit 412, the dummy data keeping unit 413, the dummy data monitoring unit 414, etc., described above may be applied to an ASIC (Application Specific Integrated Circuit), an FPGA (Field Programmable Gate Array), etc., in the frame transmitting apparatus.

Figure 3:
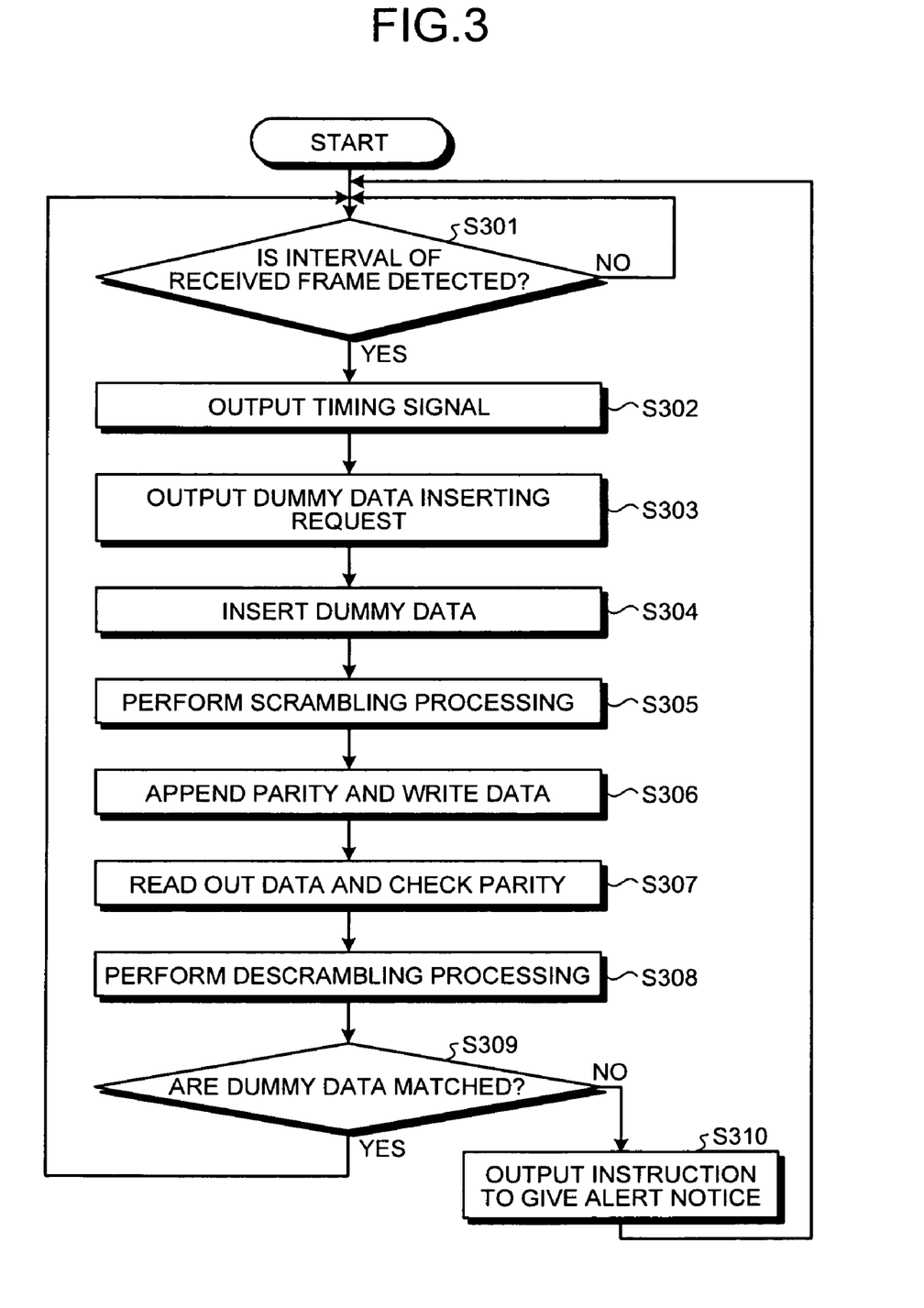
FIG. 3 is a flowchart of processing of the frame transmitting apparatus according to the first embodiment.

FIG. 3 is a flowchart of processing by the frame transmitting apparatus according to the first embodiment.

As depicted in FIG. 3, the frame monitoring unit 401, in the case of detecting the interval in which the received frame input intermittently is not detected (Yes at Step S301), generates the timing signal indicating the timing of the interval in which the received data is not detected and outputs it to the header control unit 404 (Step S302).

The header control unit 404, upon reception from the frame monitoring unit 401 of the timing signal indicating the timing of the interval in which the received frame input intermittently is not detected, calculates the time of the interval in which the received frame is not detected and, upon detection of the time of the interval in which the dummy data may be inserted, outputs the dummy data inserting request to the dummy data inserting unit 412 (Step S303).

The dummy data inserting unit 412, upon reception of the dummy data inserting request from the header control unit 404, inserts the dummy data identical to the dummy data kept by the dummy data keeping unit 413 to be described later into the scrambling unit 405 (Step S304).

The scrambling unit 405 performs the scrambling processing on the dummy data received from the dummy data inserting unit 412 (Step S305).

The parity generating unit 406 appends the parity to the dummy data received from the scrambling unit 405 after the scrambling processing and outputs the dummy data to the memory 407 and the memory 407, under control of the header control unit 404, writes the dummy data received from the parity generating unit 406 (Step S306).

Then, the memory 407, under control of the header control unit 404, reads out the dummy data and outputs it to the parity monitoring unit 408 and the parity monitoring unit 408 performs the parity check of the dummy data received from the memory 407 (Step S307).

The descrambling unit 409 performs the descrambling processing on the dummy data output from the parity monitoring unit 408 after the parity check (Step S308).

The dummy data monitoring unit 414 determines whether the dummy data output from the descrambling unit 409 and the dummy data kept in advance by the dummy data keeping unit 413 match (Step S309).

If, as a result of the determination, the dummy data output from the descrambling unit 409 and the dummy data kept in advance by the dummy data keeping unit 413 do not match (No at Step S309), then the dummy data monitoring unit 414, determining that the error is occurring in the sequence of the processing processes, outputs to the alert notifying unit 415 the instruction to give the alert notice to the managing device 500 (Step S310).

On the other hand, if the dummy data output from the descrambling unit 409 and the dummy data kept in advance by the dummy data keeping unit 413 match (Yes at Step S309), then the dummy data monitoring unit 414, determining that the error is not occurring in the sequence of the processing processes, waits for insertion of next dummy data.

As described above, the first embodiment has the effect of being capable of easily detecting the error occurring in the process of transmitting processing of the received frame.

In the first embodiment, the data does not need to be written into the memory with the error-detection FCS left appended thereto, and therefore, increased memory scale is not required for the easy detection of the error occurring in the process of the transmitting processing of the received frame.

[b] Second Embodiment

In the first embodiment, the case was described in which the dummy data monitoring unit 414 determines whether the error is occurring in the sequence of the processing processes by checking by comparison whether the dummy data output from the descrambling unit 409 after the sequence of the processing processes and the dummy data kept in advance by the dummy data keeping unit 413 match.

However, the disclosed frame transmitting apparatus is not limited to the case of determining whether the error is occurring, as described in the first embodiment. Configuration and processing will now be described, in sequence, of the frame transmitting apparatus according to a second embodiment.

Figure 4:
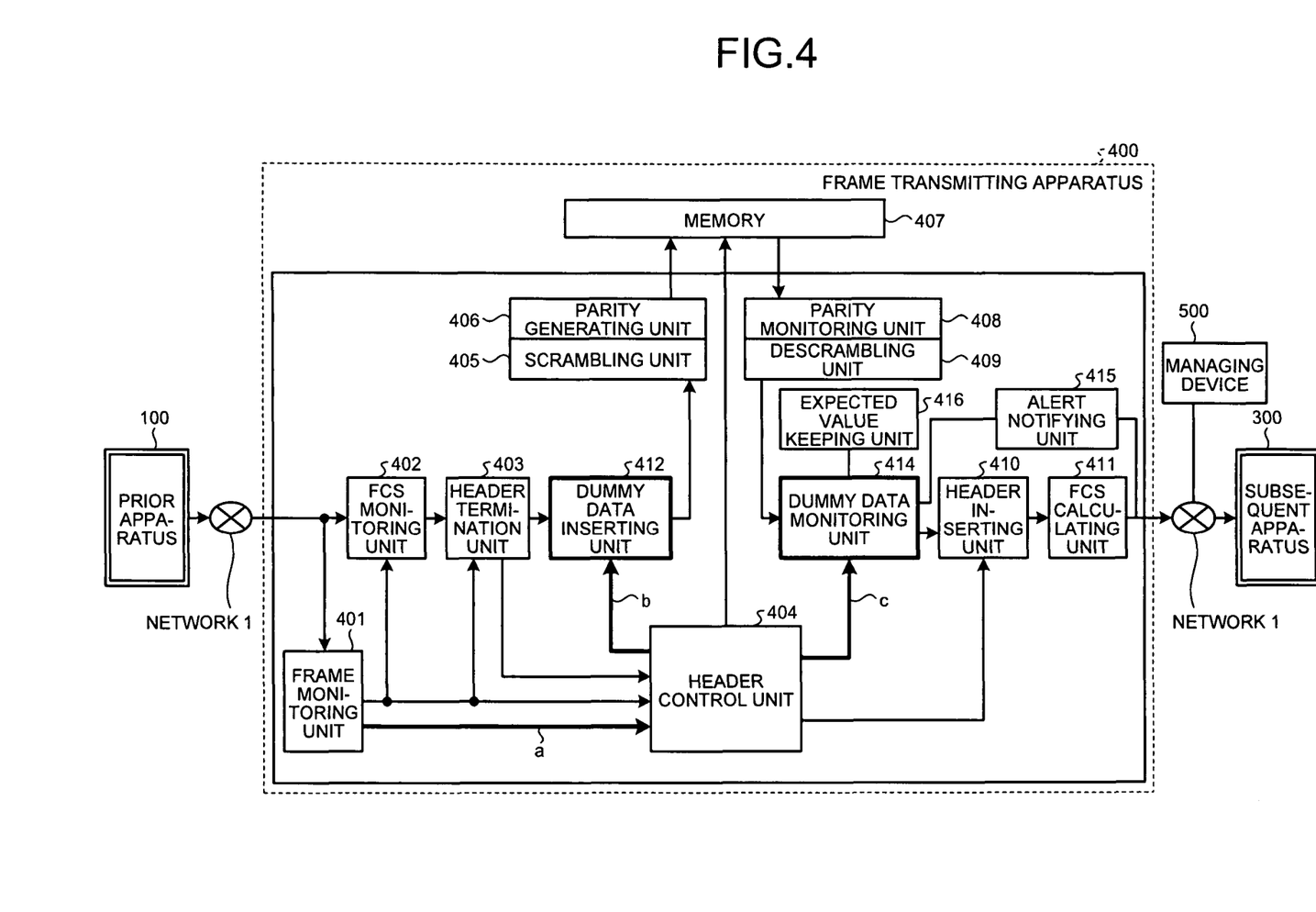
FIG. 4 is a diagram of a configuration of the frame transmitting apparatus according to a second embodiment.

FIG. 4 is a block diagram of the configuration of the frame transmitting apparatus according to the second embodiment. The configuration of the frame transmitting apparatus 400 according to the second embodiment differs from the frame transmitting apparatus according to the first embodiment in points described below.

Namely, the frame transmitting apparatus 400 according to the second embodiment has an expected value keeping unit 416 in place of the dummy data keeping unit 413.

The expected value keeping unit 416 keeps in advance as the expected value a value identical to a calculated value obtained by a CRC (Cyclic Redundancy Check) calculation of the dummy data to be inserted in the above sequence of the processing processes by the dummy data inserting unit 412.

The dummy data monitoring unit 414, by performing the CRC calculation of the dummy data output from the descrambling unit 409 after the above sequence of the processing processes and comparing a calculated value obtained as a result of the calculation and the expected value kept in advance by the expected value keeping unit 416, determines whether the error is occurring in the above sequence of the processing processes.

Specifically, the dummy data monitoring unit 414, in the case of having received the dummy data reading-out notifying signal (e.g. "c") from the header control unit 404, performs the CRC calculation of the data received from the descrambling unit 409.

The dummy data monitoring unit 414 determines that the error is occurring when, as a result of comparison of the calculated value obtained as a result of the CRC calculation and the expected value kept in advance by the expected value keeping unit 416, the calculated value and the expected value do not match.

Figure 5:
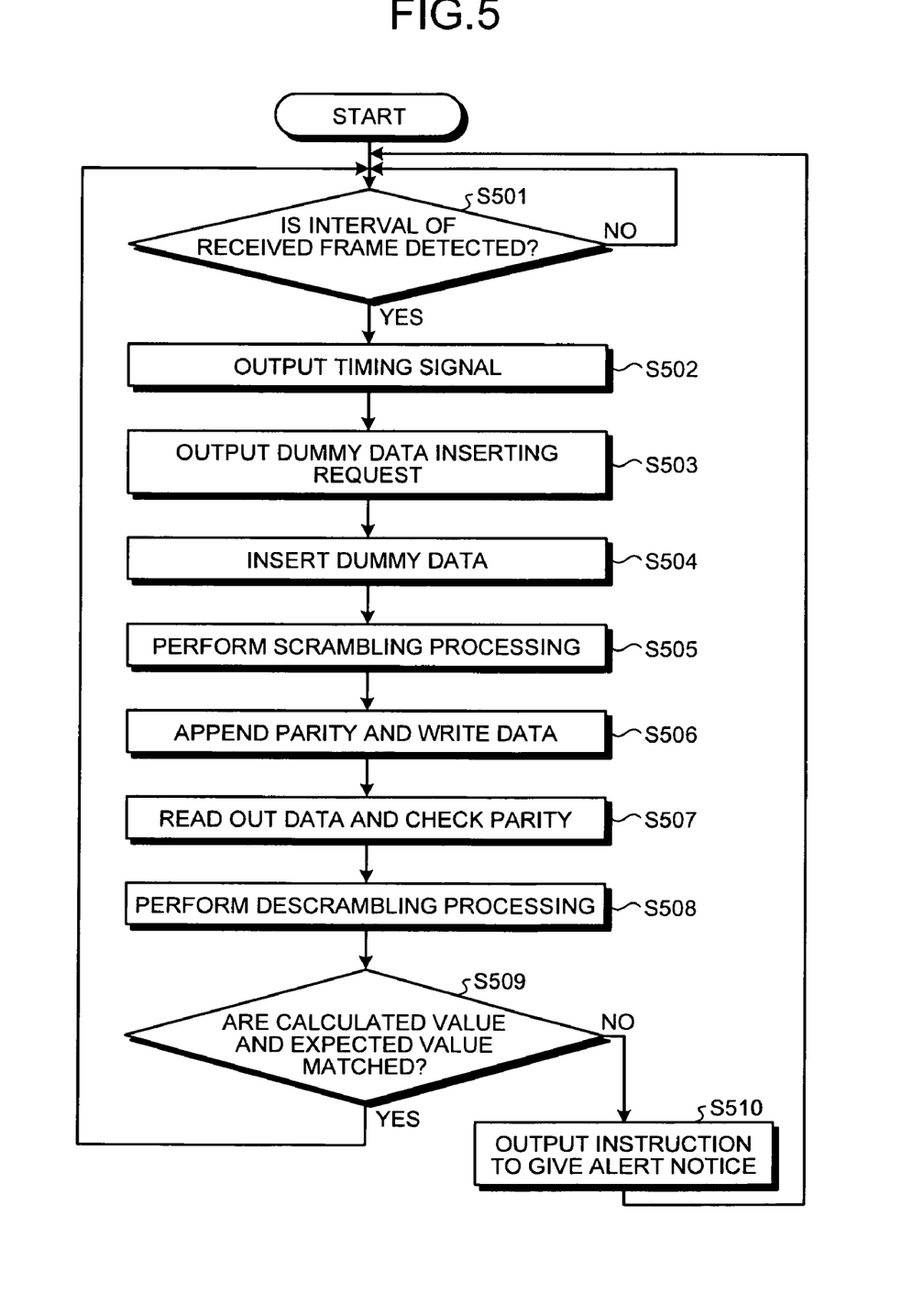
FIG. 5 is a flowchart of processing of the frame transmitting apparatus according to the second embodiment.

FIG. 5 is a flowchart of processing by the frame transmitting apparatus according to the second embodiment. The flow of the processing of the frame transmitting apparatus 400 according to the second embodiment differs from the flow of the processing of the frame transmitting apparatus according to the first embodiment in points described below.

Namely, as depicted in FIG. 5, the dummy data monitoring unit 414 performs the CRC calculation of the data received from the descrambling unit 409 and determines whether the calculated value obtained as a result of the CRC calculation and the expected value kept in advance by the expected value keeping unit 416 match (Step S509).

As a result of the determination, if the calculated value obtained as a result of the CRC calculation and the expected value kept in advance by the expected value keeping unit 416 do not match (No at Step S509), then the dummy data monitoring unit 414, determining that the error is occurring in the sequence of the processing processes, outputs to the alert notifying unit 415 the instruction to give the alert notice to the managing device 500 (Step S510).

As described above, the second embodiment, which keeps the calculated value by the CRC calculation of the dummy data as the expected value in the expected value keeping unit 416 rather than keeping in advance the dummy data in the dummy data keeping unit 413, is capable of reducing the load of keeping the data, as compared with the case of keeping the dummy data itself.

In the first and second embodiments described above, the case was described of detecting the error occurring in the sequence of the processing processes, targeting at the timing of the interval in which the received frame is not detected, during execution of ordinary frame transmitting processing in the frame transmitting apparatus 400.

However, the disclosed frame transmitting apparatus is not limited to this but may likewise be applied, for example, to the case of inserting the dummy data and checking if the error occurs in a sequence of processing processes, at a pre-shipment stage of a product.

[c] Third Embodiment

The disclosed frame transmitting apparatus 400 may be practiced in various different modes other than the examples described above. Accordingly, other embodiments will now be described.

(1) Apparatus Configuration, Etc.

Each constituent element of the frame transmitting apparatus 400 illustrated in FIGS. 2 and 4 is functionally-conceptual and is not necessarily required to be physically configured as illustrated. Namely, a specific form of distribution/integration of the frame transmitting apparatus 400 is not limited to the one illustrated.

Namely, it may be configured so that all or part thereof is functionally or physically distributed or integrated, by arbitrary unit, depending on various loads and the situation of use, such as the integration of the dummy data keeping unit 413 and the dummy data monitoring unit 414 depicted in FIG. 2 and the integration of the dummy data monitoring unit 414 and the expected value keeping unit 416 depicted in FIG. 4.

Further, each processing function performed in the frame transmitting apparatus 400 (see, e.g., FIGS. 3 and 5) can have all or an arbitrary part thereof realized by a CPU and a program analyzed and executed by the CPU or realized as hardware by a wired logic.

(2) Frame Transmitting Method

The frame transmitting apparatus described in the above examples realizes the following frame transmitting method.

Namely, the frame transmitting method is realized that includes a dummy data inserting step (see, e.g., Step S304 of FIG. 3) of inserting the dummy data, at the timing of the interval in which the received frame input intermittently is not detected, in the sequence of the processing processes of the scrambling processing of the user data cut out from the received frame, the reading-out of the data after the scrambling processing with the parity appended thereto from the memory and the parity checking thereof, and the descrambling processing of the data after the parity checking and an error determining step (see, e.g., Step S309 of FIG. 3) of determining whether the error is occurring in the sequence of the processing processes, based on the dummy data obtained by the descrambling processing of the dummy data inserted in the sequence of the processing processes by the dummy data inserting step.

According to the embodiments described above, the error caused in the process of transmitting processing of the received frame can be easily detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for frame transmission comprising:
   a dummy data inserting unit that inserts dummy data, at timing of an interval in which a received frame input intermittently is not detected, in a sequence of processing processes of scrambling processing of user data cut out from the received frame, reading-out of the data after the scrambling processing with a parity appended thereto from a memory and parity checking thereof, and descrambling processing of the data after the parity checking; and
   an error determining unit that determines whether an error is occurring in the sequence of the processing processes, based on the dummy data obtained by the descrambling processing of the dummy data inserted in the sequence of the processing processes by the dummy data inserting unit.

2. The apparatus according to claim 1, further comprising:
   a dummy data keeping unit that keeps in advance the dummy data identical to the dummy data to be inserted in the sequence of the processing processes by the dummy data inserting unit, wherein
   the error determining unit determines whether the error is occurring in the sequence of the processing processes, based on results of comparison of the dummy data obtained by the descrambling processing and the dummy data kept by the dummy data keeping unit.

3. The apparatus according to claim 1, further comprising:
   a calculated value keeping unit that keeps in advance a calculated value obtained by CRC calculating processing of the dummy data to be inserted in the sequence of the processing processes by the dummy data inserting unit, wherein
   the error determining unit determines whether the error is occurring in the sequence of the processing processes, based on results of comparison of a calculated value obtained by the CRC calculating processing of the dummy data obtained by the descrambling processing and the calculated value kept by the calculated value keeping unit.

4. The apparatus according to claim 1, further comprising an alert notifying unit that gives an alert notice to a managing device that manages the frame transmitting apparatus when the error determining unit determines that the error is occurring in the sequence of the processing processes.

5. A method for frame transmission, the method comprising:
   inserting dummy data, at timing of an interval in which a received frame input intermittently is not detected, in a sequence of processing processes of scrambling processing of user data cut out from the received frame, reading-out of the data after the scrambling processing with a parity appended thereto from a memory and parity checking thereof, and descrambling processing of the data after the parity checking; and
   determining whether an error is occurring in the sequence of the processing processes, based on the dummy data obtained by the descrambling processing of the dummy data inserted in the sequence of the processing processes in the inserting.

6. The method according to claim 5, wherein
   the determining includes determining whether the error is occurring in the sequence of the processing processes, based on results of comparison of the dummy data obtained by the descrambling processing and the dummy data kept in advance that is identical to the dummy data to be inserted in the sequence of the processing processes in the inserting.

7. The method according to claim 5, further comprising keeping in advance a calculated value obtained by CRC calculating processing of the dummy data to be inserted in the sequence of the processing processes in the inserting, wherein
   the determining includes determining whether the error is occurring in the sequence of the processing processes, based on results of comparison of a calculated value obtained by the CRC calculating processing of the dummy data obtained by the descrambling processing and the calculated value obtained by the CRC calculating processing of the dummy data inserted in the sequence of the processing processes in the inserting and kept in advance.

8. The method according to claim 5, further comprising giving an alert notice to a managing device that manages a frame transmitting apparatus when it is determined that the error is occurring in the sequence of the processing processes in the determining.

* * * * *